(12) United States Patent
Duerig et al.

(10) Patent No.: US 7,336,591 B2
(45) Date of Patent: Feb. 26, 2008

(54) DATA STORAGE MEDIUM

(75) Inventors: Urs T. Duerig, Rueschlikon (CH);
Bernd W. Gotsmann, Horgen (CH);
Walter Haeberle, Wädenswil (CH);
Mark A. Lantz, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 605 days.

(21) Appl. No.: 10/894,889

(22) Filed: Jul. 20, 2004

(65) Prior Publication Data

US 2005/0037560 A1 Feb. 17, 2005

(30) Foreign Application Priority Data

Jul. 28, 2003 (EP) .................................. 03405561

(51) Int. Cl.
*G11B 9/00* (2006.01)
*B32B 3/00* (2006.01)

(52) U.S. Cl. ........................................ 369/126; 428/200

(58) Field of Classification Search ................. 369/126, 369/288; 428/200
See application file for complete search history.

(56) References Cited

U.S. PATENT DOCUMENTS 6,066,265 A * 5/2000 Galvin et al. ................... 216/2
2002/0122766 A1* 9/2002 Lieber et al. ............. 423/447.3

FOREIGN PATENT DOCUMENTS

JP 60234207 A * 11/1985

* cited by examiner

*Primary Examiner*—Thang V. Tran
(74) *Attorney, Agent, or Firm*—F. Chau & Associates, LLC

(57) ABSTRACT

A data storage medium is introduced. The data storage medium from which information is reproduced by scanning a surface of the medium with a tip positioned in contact therewith comprises a recording layer within which data values are determined by the topographical state at the data item location. The material of said recording layer comprises a component that is generating an etchant. The etchant removes the naturally occurring surface oxide layer of the tip which keeps the tip sharp and works against tip wear.

14 Claims, 3 Drawing Sheets

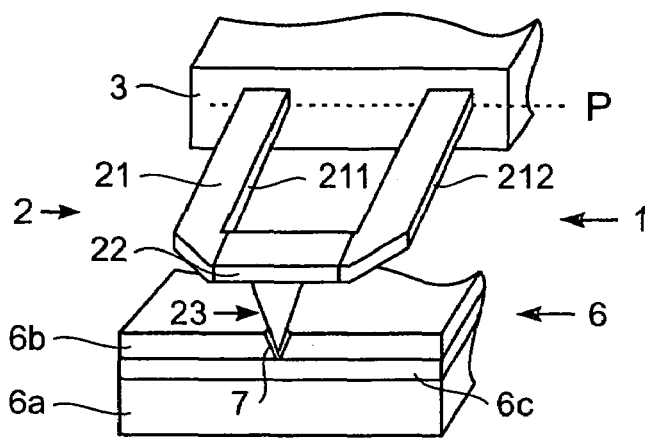
Fig. 1a
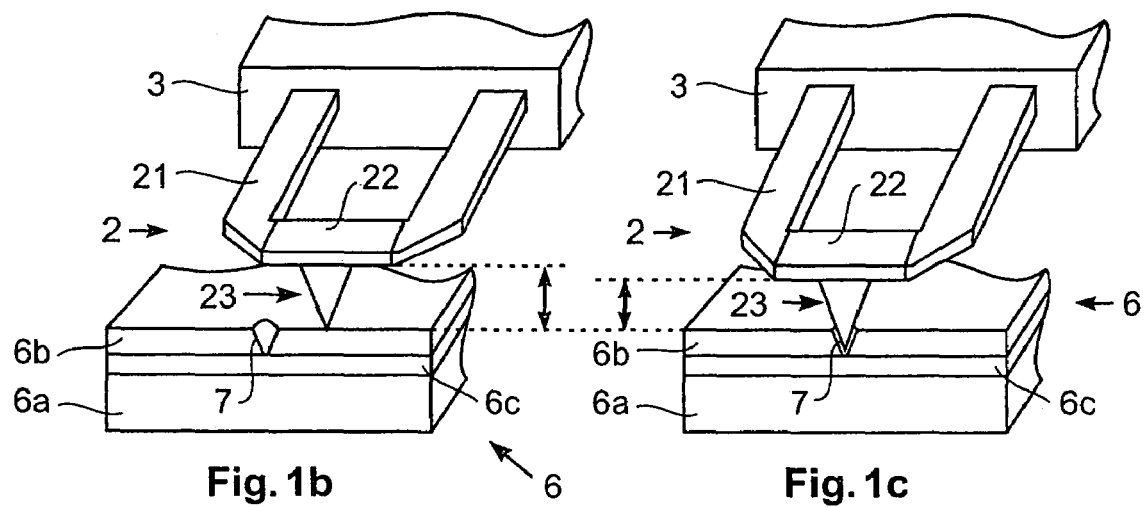
Fig. 1b   Fig. 1c

DATA STORAGE MEDIUM

FIELD OF THE INVENTION

The present invention relates generally to probe-based, and in particular AFM (Atomic Force Microscope)-based data storage systems. In particular, it relates to the ultra high density data storage systems of the type which have a tip directed in contact with the storage medium by which bit-writing and bit-reading are carried out. The medium comprises a recording surface within which data values are determined by the topographical state at a data location.

BACKGROUND OF THE INVENTION

The Atomic Force Microscope is a well-known device in which the topography of a sample is sensed by a tip mounted on the end of a microfabricated cantilever. As the sample is scanned, the interaction of forces between the tip and the sample surface causes pivotal deflection of the cantilever. The sample topography is determined by detecting this deflection. The AFM technology has also been applied to the field of data storage with a view to providing a new generation of high-density, high data-rate data storage devices for mass-memory applications. AFM-based data storage is described in detail in IEEE Transactions on Nanotechnology, Volume 1, number 1, March 2002, pages 39 to 55, Vettiger et al., and in IBM Journal of Research & Development, Volume 44, No. 3, May 2000, pp323-340, "The 'Millipede'—More Than One Thousand Tips for Future AFM Data Storage", Vettiger et al., and the references cited therein.

The cantilever-mounted tip, referred to also as the read/write tip, is used for reading and writing of data on the surface of a data storage medium. In operation, the read/write tip is biased against the surface of the data storage medium. The storage medium generally comprises a polymeric material.

In the write mode, the read/write tip is heated which results in heat transfer to the polymer surface layer causing local softening of the polymer. This allows the tip to penetrate the surface layer to form a pit, or bit indentation; such a pit represents a bit of value "1", a bit of value "0" being represented by the absence of a pit. This technique is referred to as thermo-mechanical writing.

The storage medium can be moved relative to the read/write head allowing the tip to write data over an area of the surface, or "storage field", corresponding to the field of movement. Each indentation is created by heating the cantilever tip and with the application of force pressing this tip into the polymer film. The tip is heated by passing a current through a resistive heating element integrated in the cantilever, directly behind the tip. Some of the heat generated in the resistor is conducted through the tip and into the polymer film, locally heating a small volume of the polymer. If sufficient heat is transferred to raise the temperature of the polymer above a certain temperature (which is dependent on the chosen polymer), the polymer softens and the tip sinks in, creating an indentation or bit.

In the read mode, the storage field is scanned by the tip, the position of the tip and the cantilever on which the tip is mounted differs according to the presence or absence of a pit. The reading operation uses thermo-mechanical sensing based on the principle that the thermal conductance between the cantilever, and components attached thereto, and the storage substrate, changes according to the distance between them; the distance is reduced as the tip moves into a bit indentation. Further discussion of the reading operation can be found in the above identified IBM Journal of Research & Development article.

In a multi-cantilever/tip device, multiple simultaneous operations can be carried out on a common polymer substrate by individually addressing each bit location. By virtue of the nanometer length-scale of each operation, this array of multiple bit locations in sum occupies a minimum amount of space constituting an ultrahigh density 'reactor'. Data are stored by making nanoscopic indentations in a thin polymer film using a highly parallel array of cantilevers. As described above, at each position, an indentation or pit represents a 1 and no indentation or pit represents a 0, therefore data can be stored in a traditional binary sense via the presence or absence of nanoscopic indentations in the thin polymer film which serves as the storage medium.

In such a data storage system, a single tip of the tip array has to be able to read and write up to hundred billion indentations during the system lifetime. However, due to such a mechanical exposure, wear at the tip can be observed during the system lifetime. If the tip gets blunt over time, the error rate increases until the device fails completely.

It is thus desirable to support a data storage system with low error rates due to an appropriate handling of tip-wear.

SUMMARY OF THE INVENTION

The present invention provides a data storage medium comprising a recording layer. In the recording layer data values are determined by the topographical state at a data item location. In an operation mode, the data storage medium is exposed to a read/write tip for reading/writing data values from/on the recording layer. The material of the recording layer comprises a component generating an etchant for the tip material at the area of contact with the tip.

By adding an etchant generating component to the recording layer, the tip of the data storage system can automatically and continuously be sharpened during the system lifetime: The etchant supports etching the natural oxidation of the tip automatically. As a result, a continuous oxidation sharpening process is included in the operation of writing and/or reading the data storage medium. This sharpening process will keep the tip sharp during operation at the expense of some possible tip shortening over the lifetime of the device. In another embodiment, the recording layer comprises a separate area comprising the component or the etchant. This separate area does not necessarily include data items represented by pits. This separate might also be embodied as a strip attached to the substrate. However, such areas are also considered to be part of the recording layer and thus included in the scope of the invention. The write/read tip might be placed in contact to this area, e.g on a regular basis, and might be moved in contact to this area—e.g. while being heated in order to generate the etchant out of the component—for tip sharpening purposes.

The continuous sharpening process works against tip wear and as a consequence reduces the error rate of the data storage system.

The component might already be included in the starting material that is used to build the recording layer. From the component, the etchant will be generated, e.g. by the impact of heat and/or moisture/water. Such conditions are typically present during the writing mode, when pits are written into the recording layer by having the tip in contact with the surface of the recording layer and heating the tip, e.g. up to 400 degrees Celsius or more. Whether an etchant can be generated also in the reading mode depends on the component and the reading temperature.

In an operation making the component generate an etchant at the area of contact, the etchant then removes the naturally occurring surface oxide layer of the tip which is considered as at least temporary part of the tip.

According to another aspect of the invention, there is provided a data storage medium as claimed above, but which recording layer comprising the etchant itself instead of the component generating etchant. This aspect of the invention can either represent the data storage medium as previously discussed in a state after the etchant was generated from the component. Or it might represent a recording layer that might comprise the etchant itself from the beginning and not only generate it during operation. All the preferred embodiments related to the etchant generating component are herewith also disclosed as preferred embodiments of the etchant comprising recording layer, where appropriate.

It was investigated, that fluorine can act as a preferred etchant, in particular when acting on a tip which material comprises silicon dioxide as outer tip layer to be removed.

In a preferred embodiment, the component generating the etchant contains a hexafluoroantimonate moiety. In another preferred embodiment, the component generating the etchant comprises triarylsulfonium hexafluoroantimonate. In a particular preferred embodiment, the component generating the etchant comprises triphenylsulfonium hexafluoroantimonate.

The component based recording layer makes use of exploiting the hexafluoroantimonate ion to generate hydrogen fluoride which in turn is used to etch the tip.

In a preferred embodiment, the material of the tip comprises silicon dioxide. Thus, it is preferred that the component acts as an etchant with regard to silicon dioxide. The dioxide of the silicon dioxide tip is bound by the etchant and removed when in contact. The silicon itself may comprise pure silicon material. However, an oxide layer is formed on the silicon through the impact of water or moisture. This surface oxide layer which is naturally occurring in the presence of oxygen is also regarded as material of the tip as it forms the outer layer of the tip during operation. The silicon dioxide is the part that is in contact with the recording layer during operation will then be removed.

Preferably, the recording layer is a polymer recording layer. Data values can be determined by the topographical state at a data item location in such polymer recording layer.

The data storage medium preferably comprises a silicon substrate with the recording layer being disposed on the substrate. However, according to another preferred embodiment, a layer of material immediately adjacent to the substrate can be a layer of polymer to act as a penetration stop to prevent contact between the tip and the substrate. Thus, the data storage medium may comprise the recording layer disposed on a penetration stop layer disposed on the substrate.

According to another aspect of the invention, there is provided a data storage system comprising a read/write head comprising a tip connected to a heating element locally exerting heat at the tip when an electrical current is applied. The tip acts on a data storage medium as described above. With regard to the heating element, it is preferred that the heating element comprises a resistive path for locally exerting heat at the tip when an electrical current is applied.

Such heating element supports thermo-mechanical reading and writing from/on the data storage media. The fact that the tip is heated up to few hundred degrees Celsius can be exploited: The heat which is needed for reading or writing indents thermo-mechanically from/in the storage medium can support a thermally controlled etching reaction of the tip when the recording layer comprises an etchant generating component or the etchant itself.

Preferably, a plurality of read/write heads are arranged in the form of at least one array and the data storage medium have storage areas matching the form of the one or more read/write head arrays. This embodiment is suitable with regard to high-density, high data-rate applications. As the data storage medium as such is a joint counterpart for all the read/write heads, the benefit of adding an etchant to the recording layer of the data storage medium is common to all read/write tips of the respective heads. Accordingly, tip wear can be reduced for all the tips of such a data storage system by adding an etchant to the data storage medium.

According to other aspects of the present invention, writing and reading processes for writing and reading data in such a data storage device are separately claimed by claims 12 and 13.

BRIEF DESCRIPTION OF THE DRAWINGS

Preferred embodiments of the invention will now be described, by way of example, with reference to the accompanying drawings in which:

FIGS. 1a to 1c illustrate the construction and operation of a read/write head on a data storage medium according to an embodiment of the present invention.

DETAILED DESCRIPTION OF THE DRAWINGS

Figure 2:
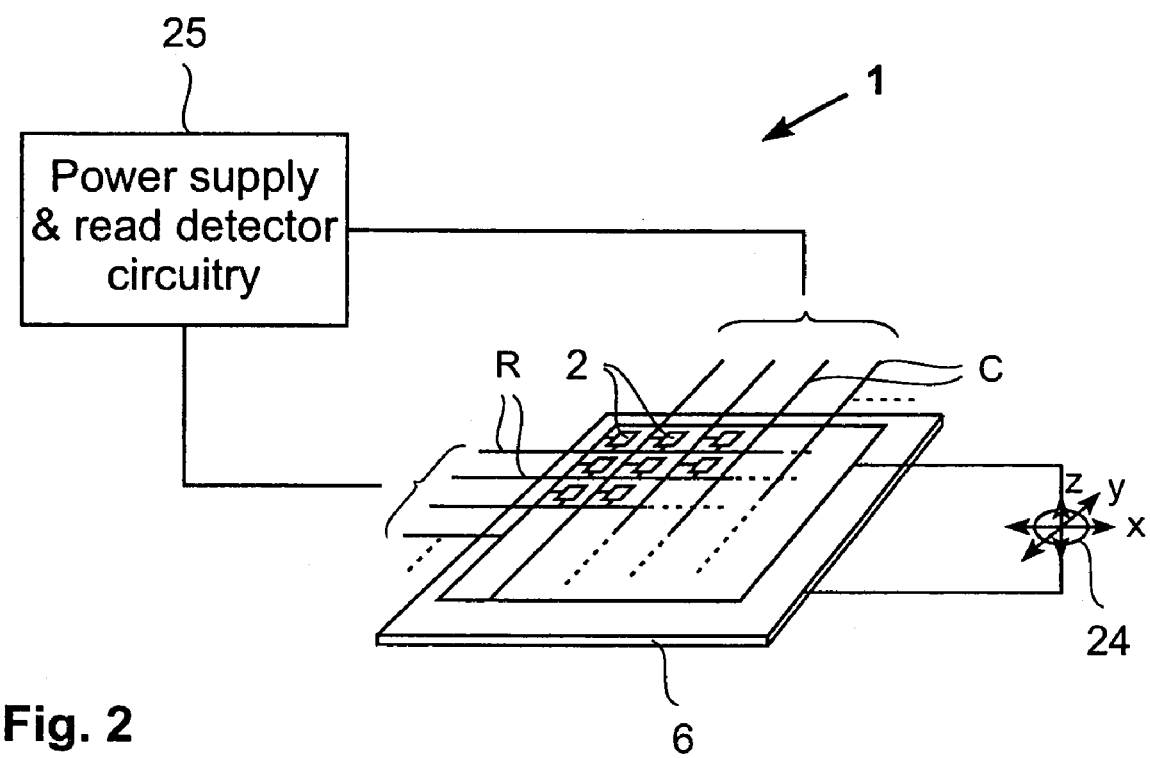
FIG. 2 is a schematic representation of a data storage device in which the data storage medium embodying the invention can be employed.

An AFM-based data storage device 1 according to an embodiment of the present invention is shown schematically in FIGS. 1a to 1c of the accompanying drawings. The data storage device 1 comprises a read/write head 2, having a generally U-shaped cantilever 21 which is connected to a support structure 3 (only partially shown in the figures). Flexing of the legs 211, 212 of the cantilever 21 provides for substantially pivotal movement of the cantilever 21 about a pivot axis P. A read/write tip 23 is provided on a heating element 22 which forms a platform at the end of the cantilever 21. The highly-doped silicon cantilever legs 211, 212 define a current path connecting the heater platform 22 between a pair of electrical supply lines (not shown) on the support structure 3.

In operation, the read/write tip 23 is biased against the surface of the data storage medium of the present invention indicated schematically at 6 and shown here in cross-section.

The storage medium comprises a substrate 6a and a polymer recording layer 6b. Thus, in operation, the read/write tip 23 is biased against the surface of the polymer recording layer 6b as can be derived from FIGS. 1a to 1c.

Also shown in FIGS. 1a to 1c is an optional penetration stop layer 6c. The polymer recording layer 6b comprises a component generating an etchant when exposed to heat, the etchant etching the tip 23 when the tip is brought in contact with the polymer recording layer 6b as shown in the FIGS. 1a to 1c.

In the write mode, the heater platform 22 can be heated to a writing temperature $T_W$ by application of a write-mode potential across the supply lines. The consequent heating of the tip 23 results in heat transfer to the polymer recording layer 6b causing local softening of the polymer. This allows the tip 23 to penetrate the recording layer 6b to form a pit, or bit indentation, 7 as shown in FIG. 1a. Such a pit represents a bit of value "1", a bit of value "0" being represented by the absence of a pit. The storage medium 6 can be moved relative to the read/write head 2 allowing the tip 23 to write data over an area of the surface, or "storage field", corresponding to the field of movement.

The process of reading data from the storage medium involves sensing the height of the tip with respect to a predetermined reference level. This may be accomplished by mechanically connecting a heat emitting resistive path to the tip, driving a current through the resistive path to a predetermined temperature and determining the thermal conductance between the resistive path and the storage medium. The thermal conductance between the resistive path and the storage medium 6 is a function of the distance between the heat emitting path and the surface of the storage medium 6.

In the illustrated example, in the read mode, the heater platform 22 is used as a thermal sensor by exploiting its temperature-dependent resistance. A read-mode potential is applied across the supply lines to heat the heating element 22 to a reading temperature $T_R$ which is less than the writing temperature $T_W$ and not high enough to cause softening of the polymer. As the storage field is scanned by the tip 23, the pivotal position of the cantilever 21 at each bit position differs according to the presence or absence of a pit 7. In the absence of a pit, as shown in FIG. 1b, the distance between the heater platform 22 and storage medium 6 is greater than the corresponding distance when a pit is present, and the tip enters the pit, as shown in FIG. 1c. Heat transport across the air gap between the heating element 22 and the storage medium 6 is thus more efficient when a pit is present at a bit position, and since more heat is then lost to the storage medium 6, the temperature of the heating element 22, and hence its resistance, will be reduced. Thus, as the storage field is scanned, the data bits are detected by monitoring changes in the temperature of the heating element, in practice by monitoring changes in the voltage across a series resistor in one of the supply lines.

While the operation of a single read/write head 2 has been explained above, in practice an array of such red/write heads is employed to produce a data storage device as described in the article referenced earlier.

Heat can be selectively transferred to the tip, e.g. only when the read/write head faces a position—also called data item location—of the data storage medium where a pit should be written into the data storage medium, or e.g. only when the read/write head faces a data item location of the data storage medium where a bit—or more general a data value—is to be read. Or heat can be continuously applied to the tip at least in the read mode. The tip might be in contact with the surface of the data storage medium, and in particular with the surface of the recording layer of the data storage medium, only when the read/write head faces a bit position on the surface. Or the tip might be continuously in contact with the surface when scanning the data storage medium.

When the tip is in contact with the recording layer 6b according to FIG. 1, the etchant included in the recording layer or generated from the component being part of the recording layer acts on the tip 23 wherever parts of the tip are in contact with the recording layer. The etchant is an etchant with regard to the tip material the etchant will be in contact with during writing or reading operations.

FIG. 2 depicts a data storage device 1 including a data storage medium 6 and a read/write apparatus as described above in the form of an array of read/write heads 2. It is to be appreciated, however, that these heads 2 may include additional circuitry, such as amplifiers etc., where required. Each read/write head 2 is connected to two supply lines, a row supply line R and a column supply line C, as indicated schematically in the figure. All heads 2 in the same row of the array share the same row supply line R. Similarly, all heads 2 in the same column of the array share the same column supply line C. Drive means, indicated schematically at 24, enables the relative movement of the array and storage medium 6, whereby the array can be accurately located in its operating position against the storage medium 6 and, during operation, each read/write head 2 can scan its individual storage field as described earlier.

The row and column lines R, C of the array are connected to power supply and read detection circuitry indicated generally at 25. Circuitry 25 operates to supply power to the components of the array, the individual read/write heads being addressed by their row and column lines in known manner via row and column multiplexers (not shown) of circuitry 25. Each read/write head 2 can be addressed in both a write mode and a read mode, the power supply circuitry supplying a write mode signal via the supply lines in the write mode, and a read mode signal via the supply lines in the read mode. The read detector circuitry of block 25 operates in the read mode to detect the bit values indicated by the read-sensing mechanisms of components 23. In general, this read detection can be performed in various ways as will be apparent to those skilled in the art. In the particular embodiments described hereinafter, however, the read detection is conveniently performed as in prior systems by measuring the voltage across series resistors connected in the column lines C of the array.

The data storage medium 6 comprises a silicon substrate having a thin layer of polymer coated thereon. A hexafluoroantimonate moiety is part of the polymer recording layer.

The data is written on and read from the storage medium as described with regard to FIG. 1 above, where data is stored by making pits/indentations in the thin polymer film using a cantilever with a tip. The tip is preferably conical in shape. The pit/indentation is created by heating the tip and pressing it into the polymer. If sufficient heat is transferred to raise the temperature of the polymer above a certain temperature (which is dependent on the chosen polymer), the polymer softens and the tip sinks in, creating an indentation or bit. Coding may thus be provided in a binary form, where e.g. the absence of a pit on the organic polymer recording surface represents a zero data bit and the presence of a pit represents a 1 data bit.

Figure 3:
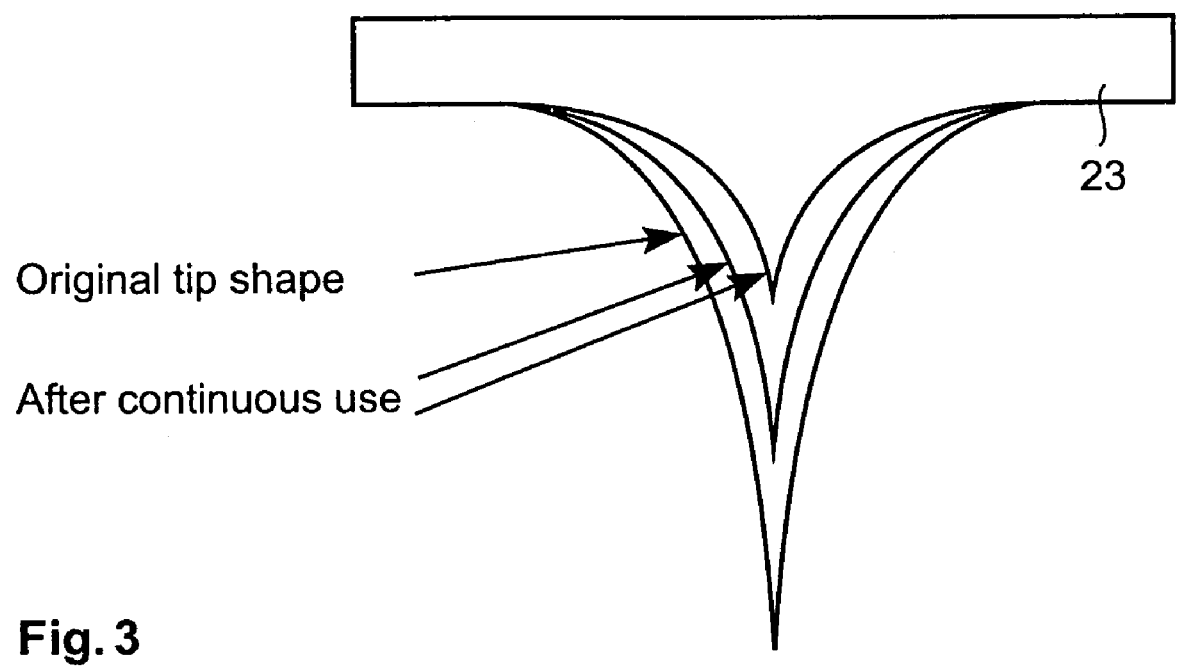
FIG. 3 illustrates a cross sectional view of the changing shape of a tip when applying etch forces on the tip.

FIG. 3 demonstrates the effect of using an etchant generating component added to a data storage medium on a contact mode operated tip. The tip 23 is shown in a cross-sectional view and at different stages of wear—i.e. "original tip shape" and 'after continuous use". As can be derived from FIG. 3, material of the tip is removed over time due to the impact of the etchant. However, the tip 23 remains sharp and thus still qualified for reading or writing purposes. The tip does not become blunt anymore.

The parts of the cantilever/tip which need sharpening are preferably the ones which are in contact with the data storage medium.

A preferred etchant comprises fluorine. A suitable component can e.g. comprise triaryl sulfonium hexafluorantimonium. By varying the time of baking the data storage medium varying degrees of fluorine content can be achieved. However, when adding/generating too much of fluorine, the tip would be overetched and destroyed in the end. By choosing the right fluorine content in the polymer, the desired tip-etching effect can be achieved and observed, and the tip will still be sharp even after billions of reading or writing operations.

In particular in data storage devices operating in a thermo-mechanical mode, the fact that the tip is heated up to few hundred degrees Celsius can be exploited profitably: The heat which is needed for writing or reading indents thermo-mechanically in the storage medium layer supports a reaction generating the etchant out of the component and supports etching the tip with regard to the oxidation process: The outer oxide layer of a silicon tip is bound by the fluorine and removed.

The invention claimed is:

1. A data storage medium,
    said medium comprising a recording layer, within which recording layer data values are determined by a topographical state at a data item location,
    said medium being exposed to a read/write tip for reading/writing data values from/on the recording layer,
    the material of said recording layer comprising a component generating an etchant for the tip material at the area of contact with the tip.

2. A data storage medium as claimed in claim 1, wherein the etchant comprises fluorine.

3. A data storage medium as claimed in claim 2, wherein the component generating the etchant contains a hexafluoroantimonate moiety.

4. A data storage medium as claimed in claim 3, wherein the component generating the etchant comprises triarylsulfonium hexafluoroantimonate.

5. A data storage medium as claimed in claim 4, wherein the component generating the etchant comprises triphenylsulfonium hexafluoroantimonate.

6. A data storage medium as claimed in claim 1, wherein the material of the tip comprises silicon dioxide.

7. A data storage medium as claimed in claim 1, wherein the recording layer is a polymer recording layer.

8. A data storage medium as claimed in claim 1, wherein the medium comprises a silicon substrate.

9. A data storage medium as claimed in claim 1, wherein a layer of material immediately adjacent to the substrate is a layer of polymer to act as a penetration stop to prevent contact between the tip and the substrate.

10. A data storage system comprising:
    a read/write head having a read/write tip connected to a resistive path locally exerting heat at the read/write tip when an electrical current is applied; and
    a data storage medium,
    said medium comprising a recording layer, within which recording layer data values are determined by a topographical state at a data item location,
    said medium being exposed to the read/write tip for reading/writing data values from/on the recording layer,
    the material of said recording layer comprising a component generating an etchant for the tip material at the area of contact with the tip in response to heat exerted heat at the read/write tip.

11. A data storage system as claimed in claim 10, comprising a plurality of read/write heads that are arranged in the form of at least one array and the data storage medium having storage areas matching the form of the one or more read/write head arrays.

12. A process for writing data to a data storage medium comprising:
    arranging a heat emitting tip connected to a resistive path, in contact with a data storage medium, said data storage medium comprising a recording layer, within which recording layer data values are determined by a topographical state at a data item location, said mediun being exposed to the heat emitting tip for reading/writing data values from/on the recording layer, the material of said recording layer comprising a component generating an etchant for the heat emitting tip material at the area of contact with the heat emitting tip; and
    driving a current through the resistive path thereby heating the heat emitting tip to a predetermined minimum data writing temperature thereby causing local softening of the polymer recording layer allowing penetration of the heat emitting tip to form a pit.

13. A process for reading data from a data storage medium comprising:
    arranging a heat emitting tip connected to a resistive path, in contact with a data storage medium, said data storage medium comprising a recording layer, within which recording layer data values are determined by a topographical state at a data item location, said medium being exposed to the heat emitting tip for reading/writing data values from/on the recording layer, the material of said recording layer comprising a component generating an etchant for the heat emitting tip material at the area of contact with the heat emitting tip; and
    driving a current through the resistive path thereby heating the heat emitting tip to a predetermined maximum temperature and determining the thermal conductance between the storage medium and the resistive path.

14. A data storage medium, said medium comprising
    a recording layer, within which recording layer data values are determined by a topographical state at a data item location,
    said medium being exposed to read/write tip for reading/writing data values on/from the recording layer,
    the material of said recording layer comprising an etchant for the tip material.

* * * * *